United States Patent [19]

Thornton

[11] 4,213,942

[45] Jul. 22, 1980

[54] PROCESS FOR THE CONCENTRATION OF MINERAL BY FLOTATION PROCESS

[75] Inventor: Edward W. J. Thornton, Bathurst, Canada

[73] Assignee: Groupe Minier Sullivan Ltee/Sullivan Mining Group Ltd., Canada

[21] Appl. No.: 871,511

[22] Filed: Jan. 23, 1978

[51] Int. Cl.[2] .......................... B01D 11/02; B03B 7/00

[52] U.S. Cl. .......................................... 423/53; 423/98; 209/3; 209/166; 209/10; 241/24; 75/101 R

[58] Field of Search ........................ 209/5, 3, 166, 167; 241/184, 20, 24; 423/53, 98; 75/2 R, 101 R

[56] References Cited

U.S. PATENT DOCUMENTS

| | | | |
|---|---|---|---|
| 687,893 | 12/1901 | Marshall | 241/184 X |
| 1,467,354 | 9/1923 | Christensen | 209/166 X |
| 1,895,354 | 1/1933 | Taylor | 241/184 X |
| 1,972,588 | 9/1934 | Hansen | 209/166 |
| 2,120,485 | 6/1938 | Clemmer | 209/167 |
| 2,164,083 | 6/1939 | Gordy | 209/166 X |
| 2,861,687 | 11/1958 | Word | 209/167 |
| 3,167,502 | 1/1965 | Duke | 209/167 X |
| 3,589,622 | 6/1971 | Weston | 209/5 |

OTHER PUBLICATIONS

Chem. Abst., 68, 1968, p. 1452, 14984g.
Chem. Abst., 69, 1968, p. 6459, 69046m.
Chem. Abst., 70, 1969, p. 167, 117275e.
Chem. Abst., 71, 1969, p. 185, 52409q.
Chem. Abst., 73, 1970, p. 141, 47647p.
Chem. Abst., 74, 1971, p. 161, 114596g.
Chem. Abst., 75, 1971, p. 150, 154085s.

*Primary Examiner*—Robert Halper
*Attorney, Agent, or Firm*—Bacon & Thomas

[57] ABSTRACT

A flotation process for concentrating tungsten or tin ores is achieved by grinding the ores with a grinding medium other than steel, first conditioning a deslimed sulfide free pulp with an acid, further treating the pulp with an emulsified collector and recovering the tungsten or tin in the float. The flotation concentrate can be further enriched by leaching with an inorganic acid.

3 Claims, 11 Drawing Figures

Fig. 4
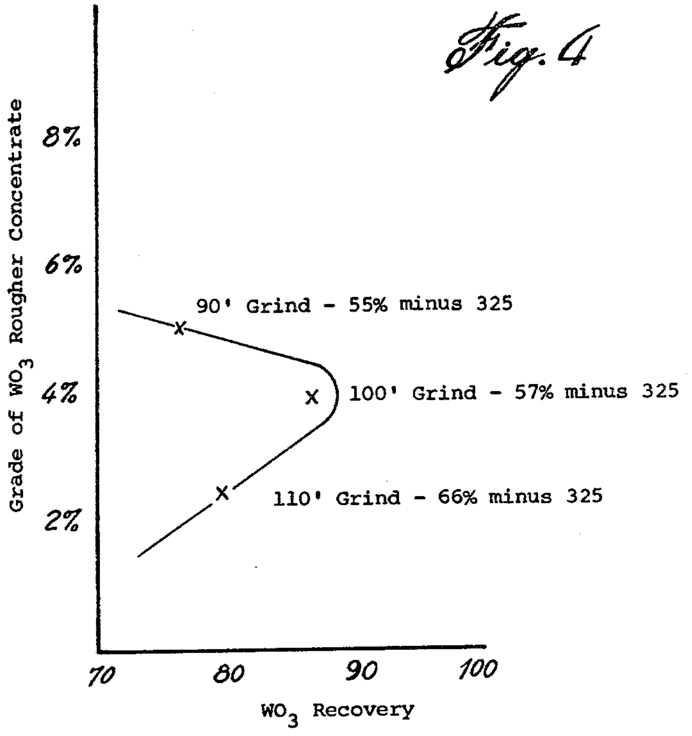
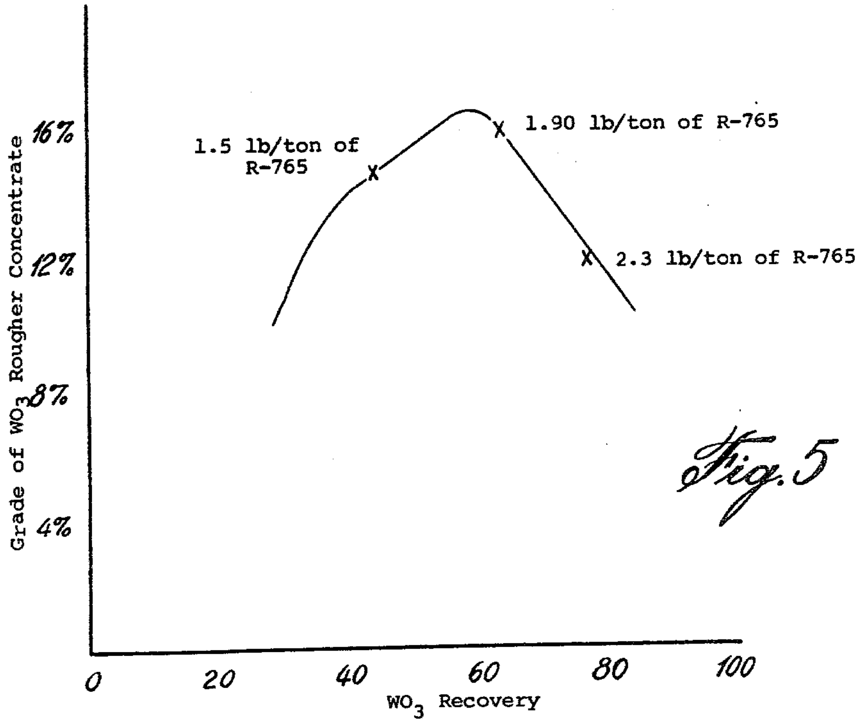
Fig. 5

PROCESS FOR THE CONCENTRATION OF MINERAL BY FLOTATION PROCESS

BACKGROUND OF INVENTION (a) Field of the Invention

This invention relates to a process for concentrating tungsten and/or tin containing mineral by flotation. More particularly, the invention relates to the recovery of the mineral wolframite by flotation.

(b) Description of Prior Art

At present all wolframite is recovered by the use of gravity equipment using jigs, spirals, tables, sluice boxes and in some instances recovery is accomplished using the weak magnetic properties of the mineral wolframite by means of a wet or dry high intensity magnetic separator. However the gravity means of separation make it very difficult to recover the very fine wolframite (minus 75 micron) and there is little separation from the other heavy metals that exist in the ore with wolframite. The high intensity magnetic separation does little to distinguish between wolframite and the other iron bearing minerals or iron stained minerals, which are also magnetic.

SUMMARY OF INVENTION

It is an object of the present invention to provide a process for the recovery of wolframite and/or cassiterite which comprises:

grinding a wolframite and/or cassiterite bearing rock with coarse pieces of said rock and removing −80 mesh material, floating off sulphides from the ground material, desliming the sulphides free ground material to remove substantially all −8 micron material still present in the ground material, thereby forming a pulp, conditioning the deslimed sulphides free pulp by a treatment selected from the group consisting of aerating with air agitation and conditioning with mechanical agitation, in the presence of about 2 to 3 pounds per ton of a substance selected from the group consisting of hydrofluoric acid, hydrofluo acid and lactic acid, added as such, activating the pulp by means of another said treatment during about 20 minutes to about 3 hours in the presence of about 0.2 to about 2.50 pound per ton of pulp of one single emulsified collector selected from the group consisting of an emulsified fatty acid type collector and an emulsified phosphoric acid based collector, and floating said further activated pulp during about 5 to about 15 minutes at a pH ranging from about 5.5 to about 6.5, to recover said wolframite and/or cassiterite.

After the grinding is accomplished to the size required for optimum liberation of the ore bearing minerals all the sulphides are floated off by conventional methods known per se. The fluorspar minerals if they also exist may be recovered by conventional methods without any harm done to the subsequent recovery of wolframite or other tungsten and tin mineral by the process according to this invention.

For best performance for the recovery of tungsten, the feed to the tungsten flotation process is then deslimed in one or two stages either with the use of cyclones or with the use of thickeners. In this stage of the process, the purpose is to remove all minus 8 micron material that might interfere with the tungsten flotation procedure taking place towards the end of the process.

The deslimed product is then conditioned or aerated for a short period of time at high or low density, high density being preferred with either of the following reagents: (a) hydrofluoric acid; (b) hydrofluosilicic acid; (c) lactic acid.

For economical reasons hydrofluosilicic acid (a biproduct material) is the most desired reagent.

After a thorough mixing with either of these three reagents, the pulp is further conditioned or aerated at high or low density (high density being preferred) for a period that may vary from twenty minutes to 3 hours, with a fatty acid type collector that has been emulsified. Examples of fatty acids include those known under the trademarks R-765* (highly refined fatty acid consisting of oleic and linoleic acids, a very small amount of resin acids, and a fatty acid base emulsifying agent), Neofat 94-04* or Acintol A-1* and the emulsifier which is used to emulsify the collector include for example that which is known under the trademark RD 3626 7*.

*Trademark

Phosphoric acid type flotation collectors can also be used. Examples include those known under the trademarks Hoe 7 1415*, or Hoe 1558* (phosphoric acid esters). It has been found according to the invention that the fatty acid type collectors perform better when given high density conditioning (mechanical agitation) and that the phosphoric acid base collectors give superior performance when they are given high density aeration (air agitation).

*Trademark

The flotation of the conditioned pulp is then carried out in conventional flotation equipment preferably for a period of 5 to 15 minutes at a pH ranging from 5.5 to 6.5.

By using this technique the wolframite minerals can be easily separated from topaz, quartz, quartzite, toumaline, fluorspar, iron oxides and chlorites, which are all quite common host minerals for the mineral wolframite ($FeMnWO_4$).

The depressants which are used in the process according to the invention cause beneficial effects especially when the grind has been made without the use of steel grinding media. This is the reason why coarse pieces of the ore to be ground are used for grinding.

The process according to the invention is also beneficial in recovering the mineral cassiterite $SnO_2$ along with the tungsten more fully described hereinbelow. However, it must be remembered that the process according to this invention especially applies to the family of tungsten minerals called wolframite, including ferberite and hubnerite. As for the tungsten mineral called scheelite, it is commonly floated now in practice in alkaline circuit.

The flotation rougher concentrate of wolframite can be further enriched by additional cleaner flotation steps in conventional machines. This enrichment is further enhanced by more addition or additions of the depressants to the cleaner circuits as will be discussed more in detail hereinafter.

This flotation concentrate can then be further enriched to marketable products by leaching with mineral acids and further steps of wet high intensity magnetic separation which will separate the tungsten minerals from the tin minerals, all as well known in the art. It must however be understood that this last cleaning step using acid leaching and wet magnetic separation does not form part of the present invention, but is only mentioned to show how a product produced by the process according to the present invention can be further enriched into a marketable product.

BRIEF DESCRIPTION OF DRAWINGS

The invention will now be described with reference to the annexed drawings which are given only for the purpose of illustration without limiting the scope of the present invention. In the drawings:

FIG. 4 is a curve showing the $WO_3$ recovery with respect to the grinding time;

FIG. 5 is a curve showing the $WO_3$ recovery with respect to the amount of another fatty acid;

DESCRIPTION OF PREFERRED EMBODIMENTS

Figure 1:
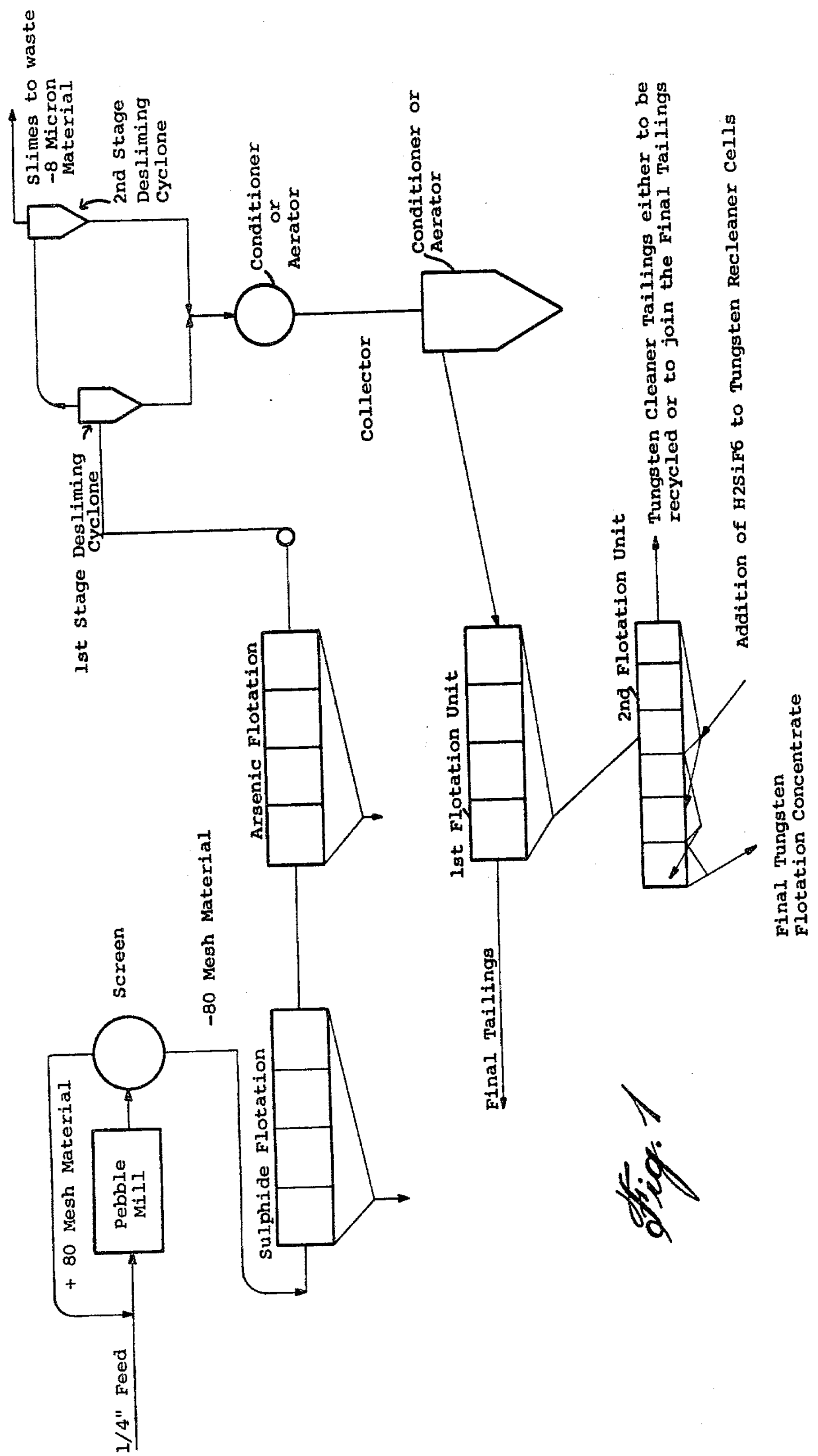
FIG. 1 is a diagram which shows the various steps of a process according to the invention.

With reference to FIG. 1, the process is initiated by feeding a rough-¼ inch feed of a wolframite ore bearing rock into a pebble mill where grinding of the ore takes place using coarse pieces of the ore. The ground material is then sent to a Sweco* screen which screens the −80 mesh material and recycles the +80 mesh to the pebble mill.

*Trademark

The −80 mesh material is introduced into a sulphide flotation unit where all the sulphides are floated away, then into an arsenic flotation unit which removes the arsenic from the −80 mesh material.

The sulphides- and arsenic-free feed is then sent to a first stage desliming cyclone, then to a second stage desliming cyclone in order to remove all the −8 micron material which could well interfere with the tungsten flotation.

The deslimed material from which substantially all the −8 micron portion has been removed is then sent to a first conditioner or aerator where one of the following reagents is added in amounts which preferably vary between 1.0 to 3.0 pounds per ton of pulp: hydrofluoric acid; hydrofluosilic acid; lactic acid; and where thorough mixing takes place.

The pulp is then sent to a second aerator or conditioner where a fatty acid or a phosphoric acid base collector, or the like is added under thorough mixing Examples of flotation reagents which exhibit collecting power for wolframite include:

(I) R-765*;
(II) Hoe F 1415*;
(III) Hoe F 1837* (mixed with NaOH);
(IV) Neofat 94-04* with an emulsifier;
(V) C.E.S. 285* with an emulsifier;
(VI) Cyclohexane phosphonic acid;
(VII) Benzene phosphonic acid;
(VIII) Hydroxamic acid;
(IX) Armac 252*;
(X) Paratolyl arsenic acid;
(XI) Reagent 825*.

*Trademark

During treatment of the pulp in the conditioner or aerator, the pulp is preferably at about 20 p.s.i. and in any case, the pressure should be sufficient to enable the air to reach the top of the container which contains the ground mineral. Treatment in the conditioner or aerator is preferably short, usually 5 to 10 minutes up to 1½ hour.

Finally, the pulp is sent to a first flotation unit of the conventional type where the treatment lasts 5 to 10 minutes at a pH between 5.5 to 6.5 where the final tailings are removed.

The flotation rougher concentrate is sent to a second flotation unit for further enriching wolframite, during which there is an addition of 0.1 to 0.5 pound per ton of $H_2SiF_6$ or other depressants. The tungsten cleaner tailings are either recycled or join the final tailings. The final tungsten flotation concentrate is separated.

The main impurities in the tungsten flotation concentrates are quartz with iron stains, chlorites, loellingite and cassiterile with iron stains. Leaching this product with 700 lb/ton of sulphuric acid removes the iron stains and destroys the iron chlorites, so that the leach residue can readily be upgraded to 60–65% $WO_3$ with two stages of high intensity magnetic separation, and containing 90–95% of the tungsten that was in the flotation concentrate. The tin, arsenic and insolubles are all rejected. If traces of arsenic remain with the tungsten concentrate, these can be removed by baking the tungsten concentrate for one hour at 280° C. with sulphuric acid followed by water leach.

The invention will now be illustrated by means of the following examples, which however are not given for the purpose of restricting the scope of the present invention:

EXAMPLE 1 (test # 66)

Feed containing:
$WO_3$: 0.40%
Bi: 0.094%
$MoS_2$: 0.251%
Cu: 0.038%
Pb: 0.023%
Zn: 0.107%
As: 0.478%
Fe: 4.32%
Ca: 2.55%

(a) standard grinding, sulphides and arsenic removal, and desliming, followed by:
(b) $H_2SiF_6 \rightarrow WO_3$ conditioner: 2.37 lb/ton
(c) Hoe F 1415*→$WO_3$ aerator: 0.35 lb/ton
(d) Tungsten cleaner flotation with $H_2SiF_6$: 1.18 lb/ton
(e) Tungsten final concentrate: 33.40% $WO_3$
(f) Tungsten cleaner tailing: 0.56% $WO_3$

*Trademark

Example 2 (test # 59)

By operating under the same conditions as in Example 1, but using a feed containing:

$WO_3$: 0.47%
Bi: 0.13%
$MoS_2$: 0.27%
Cu: 0.055%
Pb: 0.033%
Zn: 0.13%
As: 0.31%
Ca: 2.34%
Fe: 3.94%

The results are:

Tungsten final concentrate: 13.7% $WO_3$
Tungsten cleaner tailing: 0.27% $WO_3$

Example 3 (test # 42)

By operating under the same conditions as in Example 1, except that:

(b) $H_2SiF_6 \rightarrow WO_3$ conditioner: 4.42 lb/ton
(c) HoeF 1415*→$WO_3$ aerator: 0.53 lb/ton and a feed containing:

$WO_3$: 0.318%
Bi: 0.072%
$MoS_z$: 0.22%
Cu: 0.035%
Pb: 0.054%
Zn: 0.16%
As: 0.25%
Fe: 3.48%
Ca: 1.67%

The results are:

Tungsten final concentrate: 8.98% $WO_3$
Tungsten cleaner tailings: 0.32% $WO_3$

*Trademark

The pH of the tungsten rougher float was 5 and the cleaner flotation was carried out with 0.09 lb/ton $H_2SiF_6$.

Example 4

Figure 2:
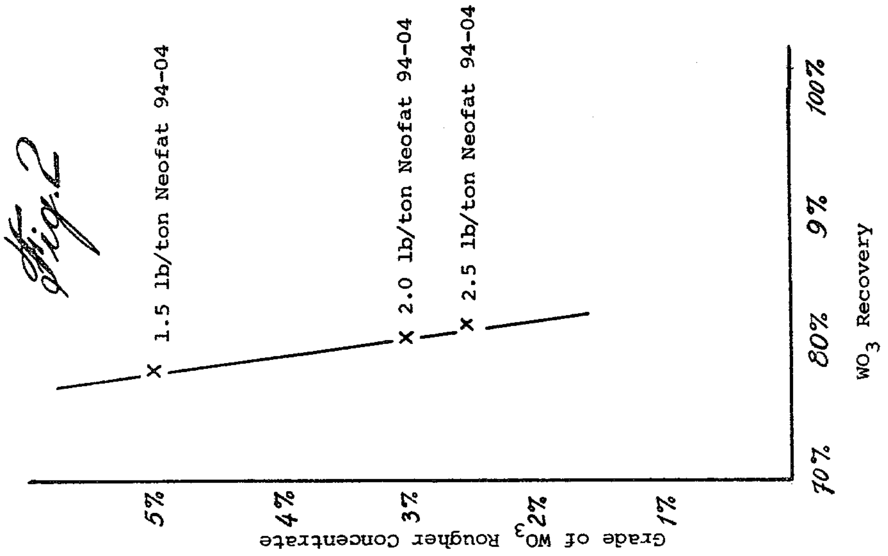
FIG. 2 is a curve showing the $WO_3$ recovery with respect to the amount of fatty acid used.

Tests were made in order to determine the effect of Neofat 94-04* consumption on the recovery of $WO_3$. Each test included grinding wolframite 80 minutes with pebbles, sulphide floats, desliming, conditioning 10 minutes with 3.0 lb/ton $H_2SiF_6$, followed by another conditioning with Neofat 94-04. It was found that when the Neofat 94-04 was made up of 1 part emulsifier, 10 parts Neofat 94-04 and 190 parts of water, there was a slight increase in $WO_3$ recovery for each increase in the amounts of Neofat 94-04. Reference is made to FIG. 2.

*Trademark

Example 5

Figure 3:
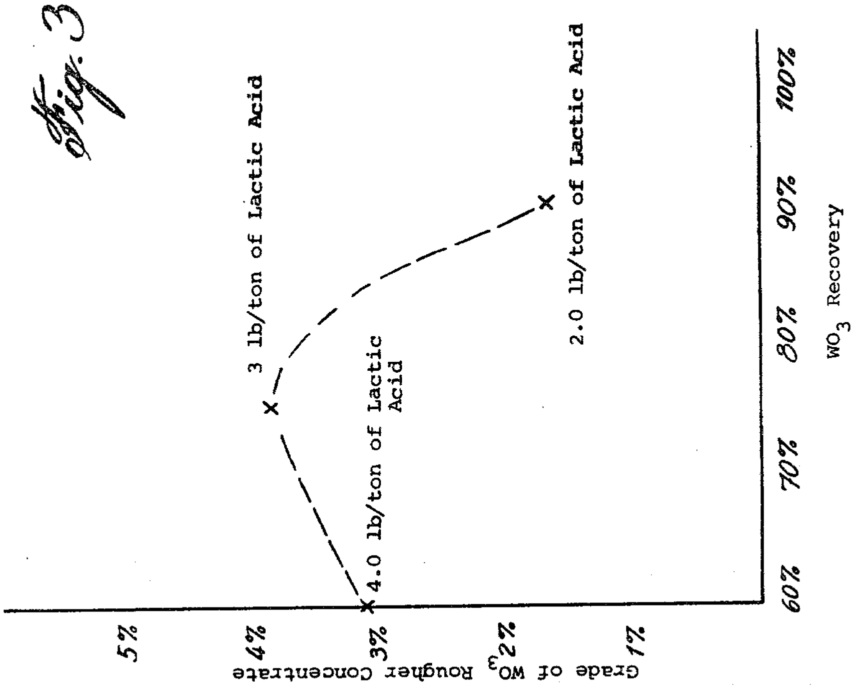
FIG. 3 is a curve showing the $WO_3$ recovery with respect to the amount of lactic acid used.

Tests were made in order to determine the effect of lactic acid on the recovery of $WO_3$. Each test included 80 minutes grinding of wolframite with pebbles, sulphide floats, desliming, conditioning 10 minutes with lactic acid followed by further conditioning for 50 minutes with 2.3 lb/ton of R-765*. It was found that the percentage of $WO_3$ recovery is also satisfactory when using lactic acid. Reference is made to FIG. 3.

*Trademark

Example 6

Tests were made in order to determine the effect of grinding time on the $WO_3$ recovery. Each test included grinding the wolframite ore with pebbles, sulphide floats, desliming, conditioning 10 minutes with 2.5 lb/ton of $H_2SiF_6$, then conditioning in another step for 50 minutes with 2.3 lb/ton of R-765*. The feed contained 0.52% $WO_3$ in each case. It was found that an increase of grinding time from 90 minutes to 100 minutes increases the $WO_3$ recovery. However, when grinding during 110 minutes, the $WO_3$ recovery was described slightly. Reference is made to the graph of FIG. 4.

*Trademark

Example 7

Tests were made in order to determine the effect of R-765 consumption on the recovery of $WO_3$. Each test included grinding the ore with pebbles, sulphide floats, desliming, conditioning 10 minutes with 3.0 lb/ton of $H_2SiF_6$, followed by conditioning 50 minutes with R-765*. The feed contained 0.52% $WO_3$ in each case. It was found that the percentage of $WO_3$ recovery increased with an increase of R-765. Reference is made to the graph of FIG. 5.

*Trademark

Example 8

Tests were made to determine the effect of Neofat 94-04 on lower grade ore containing 0.0260% $WO_3$ and 0.024% Sn.

Figure 6:
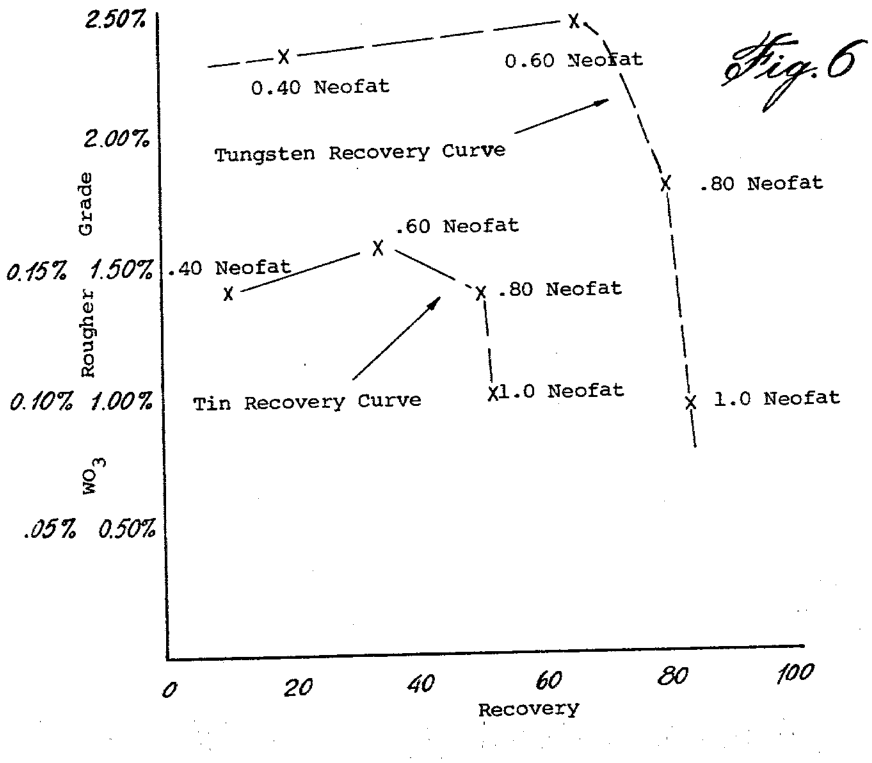
FIG. 6 is a curve showing the effect of a fatty acid on the recovery of a lower grade ore containing tungsten and tin.

After standard pebble grind, sulphide and fluorspar floats, desliming, 15 minute conditioning with 1.75 lb/ton of HF followed by 45 minute conditioning with Neofat 94-04* emulsion, it was found that recovery of tungsten increased as the amount of Neofat 94-04* increases. Reference is made to the graph of FIG. 6.

*Trademark

Example 9

Tests were made in order to determine the effect of varying the amount of hydrofluoric acid when using 0.80 lb/ton of Neofat 94-04* as collector on ore assaying 0.30% $WO_3$.

Figure 7:
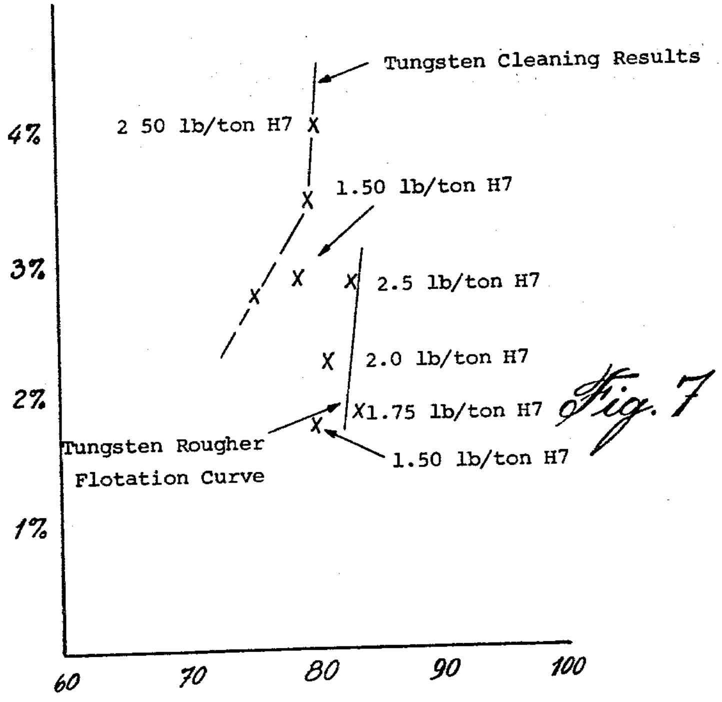
FIG. 7 is a curve showing the effect of varying the amount of hydrofluoric acid when using a fatty acid collector on a tungsten containing ore.

It was found that the amount of hydrofluoric acid does not have much influence on the recovery of tungsten. Reference is made to the graph of FIG. 7.

*Trademark

Example 10

Figure 8:
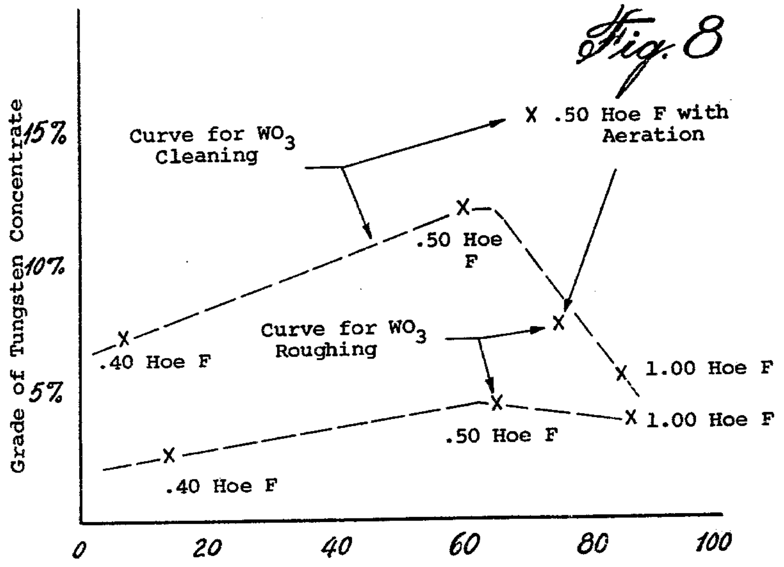
FIG. 8 is a curve showing the tungsten recovery using a phosphoric acid reagent.

Tests were made to determine the effect of the consumption of Hoe F 1415* with conditioning and aeration. Each test include a ninety minute pebble grind, sulfide and fluospar floats, desliming a 15 minute aeration or conditioning with 1.75 lb/ton of HF followed by a 45 minute aeration or conditioning with Hoe F 1415*. The feed assay was 0.52% $WO_3$ in each case. It was found that the recovery percentage increased with the amounts of Hoe F 1415* added during conditioning and aeration. Reference is made to FIG. 8.

*Trademark

Example 11

Figure 9:
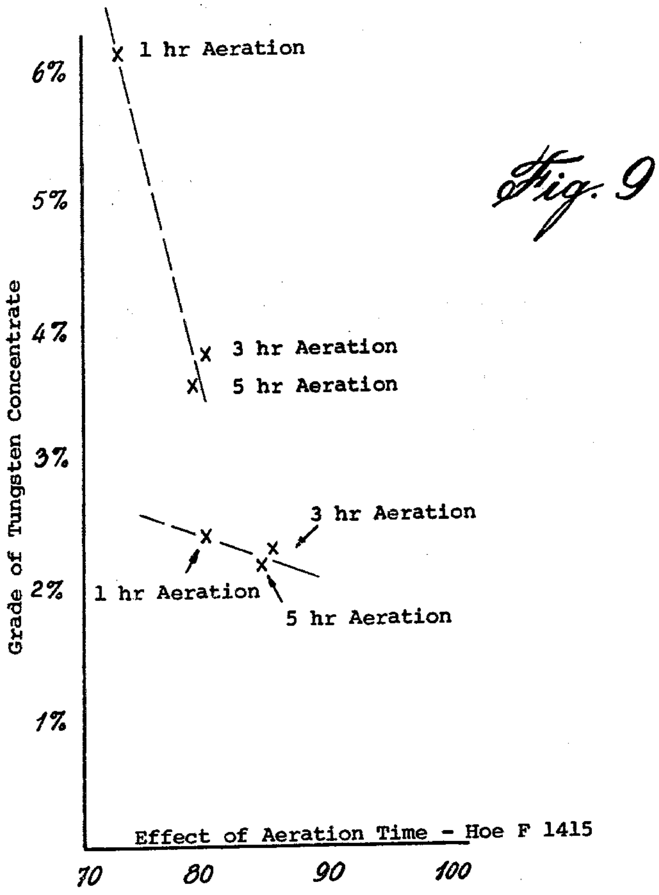
FIG. 9 is a curve showing the effect of aeration time on the tungsten recovery using a phosphoric acid reagent.

Tests were made in order to determine the effect of aeration time when using Hoe F 1415*. Each test included an 80 minute pebble grind of wolframite, a sulphide float, desliming, aeration for 10 minutes with 3.0 lb/ton of $H_2SiF_6$ followed by aeration with 0.5 lb/ton Hoe F 1415*. The feed contains 0.52% $WO_3$ in each case. It was found that the recovery percentage slightly increases with time, as shown in the graph of FIG. 9.

*Trademark

Example 12

Figure 10:
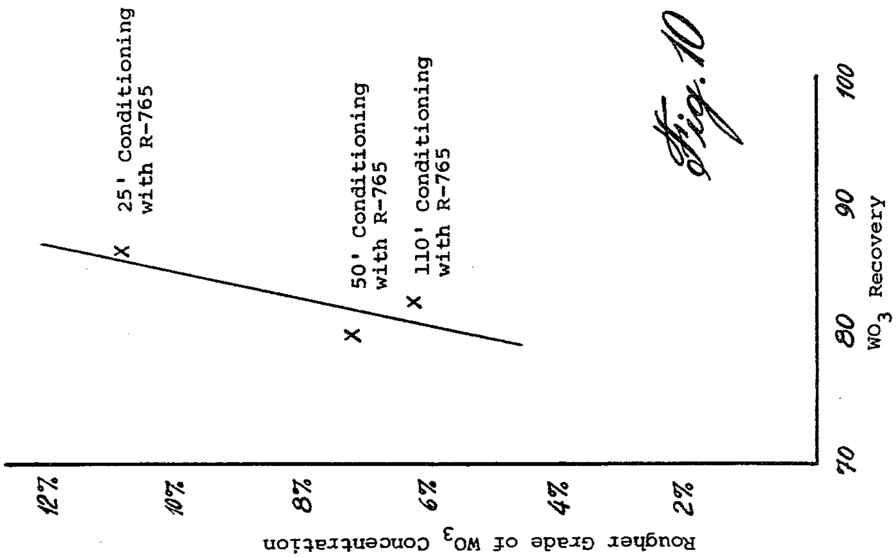
FIG. 10 is a curve showing the effect of varying the conditioning time on the $WO_3$ recovery.

Tests were made in order to determine the effect of varying to conditioning time on the $WO_3$ recovery. Each test included an 80 minute grind of wolframite, desliming, 10 minute first conditioning with 2.5 lb/ton of $H_2SiF_6$ and second conditioning of varying time with 2.3 lb/ton of R-765*. It was found that the $WO_3$ recovery was better with less conditioning. Reference is made to FIG. 10.

*Trademark

Example 13

Figure 11:
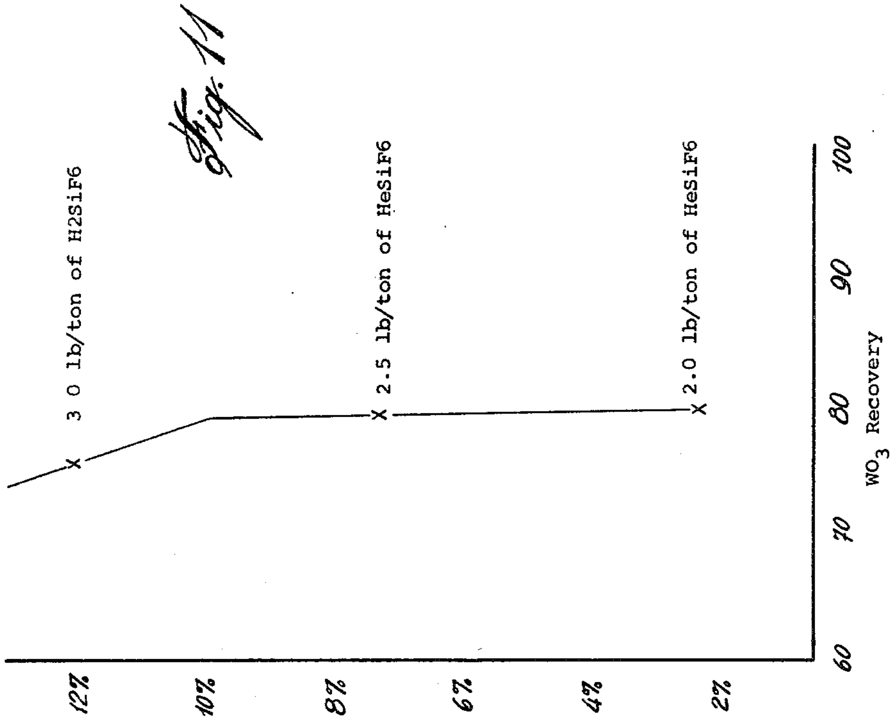
FIG. 11 is a curve showing the effect of $H_2SiF_6$ consumption on $WO_3$ recovery.

Tests were made in order to determine the effect of the $H_2SiF_6$ consumption on the $WO_3$ recovery. Each test included an 80 minute grind of wolframite, sulphides and arsenic float, desliming, 10 minute conditioning with $H_2SiF_6$ followed by 50 minute conditioning with 2.30 lb/ton of R-765*. It was found that above 2.5 lb/ton $H_2SiF_6$, the $WO_3$ recovery is less. Reference is made to FIG. 11.

*Trademark

I claim:

1. A process for the recovery of wolframite and/or cassiterite which comprises:

grinding a wolframite and/or cassiterite bearing rock with coarse pieces of said rock and removing −80 mesh material, floating off sulphides from the ground material, desliming the sulphides free ground material to remove substantially all minus 8 micron material still present in the ground material, thereby forming a pulp, conditioning the deslimed sulphides free pulp by a treatment selected from the group consisting of aerating with air agitation and conditioning with mechanical agitation, in the presence of about 2 to 3 pounds per ton of a substance selected from the group consisting of hydrofluoric acid, hydrofluosilicic acid and lactic acid, added as such, activating the pulp by means of another treatment during about twenty minutes to about three hours in the presence of about 0.2 to about 2.50 pound per ton of pulp of one single emulsified collector selected from the group consisting of an emulsified fatty acid type collector and an emulsified organic phosphoric acid base collector, a paratolyl arsenic acid collector and a hyxroxamic acid collector and floating said further activated pulp during about 5 to about 15 minutes at a pH ranging from about 5.5 to about 6.5, to recover said wolframite and/or cassiterite.

2. A process according to claim 1, which comprises upgrading the recovered wolframite and/or cassiterite by acid leaching with a member selected from the group consisting of hydrofluoric acid and hydrofluorosilicic acid.

3. A process according to claim 1, wherein said emulsified phosphoric acid flotation collectors are selected from the group consisting of cyclohexane phosphonic acid, benzene phosphonic acid, hydroxamic acid and paratolyl arsenic acid.

* * * * *